United States Patent [19]

Dedeyne et al.

[11] Patent Number: 4,733,523

[45] Date of Patent: Mar. 29, 1988

[54] HEADER FLOTATION SYSTEM FOR AN AGRICULTURAL MACHINE

[75] Inventors: Alfons W. Dedeyne, Roeselare; Roger C. Deroo; Guy H. J. Osselaere, both of Zedelgem, all of Belgium

[73] Assignee: New Holland Inc., New Holland, Pa.

[21] Appl. No.: 43,896

[22] Filed: Apr. 29, 1987

[51] Int. Cl.$^4$ .................. A01D 34/28; A01D 75/28
[52] U.S. Cl. ........................................ 56/209; 56/10.2
[58] Field of Search .............. 56/208, 209, 210, 10.2, 56/14.5, 14.6, DIG. 10; 130/27 AE

[56] References Cited

U.S. PATENT DOCUMENTS

| | | | |
|---|---|---|---|
| 2,750,728 | 6/1956 | Bailey | 56/209 |
| 2,753,675 | 7/1956 | Harp | 56/209 |
| 2,780,903 | 2/1957 | Kroll et al. | 56/209 |
| 2,796,717 | 6/1957 | Orelind et al. | 56/209 |
| 2,821,059 | 1/1958 | Heitshu | 56/209 |
| 3,008,724 | 11/1961 | Lapins et al. | 56/209 |
| 3,386,235 | 6/1968 | Van der Lely | 56/210 |
| 3,981,125 | 9/1976 | Kerber et al. | 56/14.5 |
| 4,253,295 | 3/1981 | Knepper | 56/15.6 |
| 4,266,391 | 5/1981 | McDuffie et al. | 56/14.5 |
| 4,266,395 | 5/1981 | Bashan | 56/209 |
| 4,527,381 | 7/1985 | Mann | 56/209 |

Primary Examiner—John Weiss
Attorney, Agent, or Firm—Larry W. Miller; Frank A. Seemar; Darrell F. Marquette

[57] ABSTRACT

A harvester having a mobile base unit adapted for movement over the ground, a transversely extending crop harvesting header supported from the base unit for allowing pivotal movement about a generally fore-and-aft axis of the machine, and a lateral flotation system for pivoting the header about the generally fore-and-aft axis is disclosed wherein the lateral flotation system includes a two way hydraulic actuator means extending between the header and the base unit for pivoting the header in the one or the other direction and positioning the header in a nominal position intermediate opposed extreme positions prior to starting flotation operation, a pressure source coupled by a pair of pressure fluid supply lines to the hydraulic actuator means, and energy storage means connected to the hydraulic actuator means. The energy storage means is in the form of a hydro-pneumatic accumulator coupled to each one of the pressure fluid supply lines and pressurized at a pressure greater than the working pressure of the hydraulic actuator means for pivoting the header in the one or other direction, such that, when the header is positioned at a nominal position and meets an obstruction, said header is permitted to temporarily pivot in the one or other direction away from its nominal position for moving over said obstruction.

11 Claims, 8 Drawing Figures

HEADER FLOTATION SYSTEM FOR AN AGRICULTURAL MACHINE

BACKGROUND OF THE INVENTION

The invention relates to a flotation system for a header of an agricultural machine and although it will be discussed primarily in relation to combine harvesters, it is to be understood that it is applicable to any other type of agricultural machine which employs a header, such as a forage harvester, for example.

Combine harvesters, particularly the self-propelled type, are equipped to utilise a variety of crop-gathering headers, including headers specifically designed for harvesting corn, cereal grains or soy beans, for example. Normally, these headers are attached to the forward end of a feeder housing which is a structure used to convey crop material from the header to a base unit of the combine harvester for further harvesting treatment. As is shown in U.S. Pat. No. Re. 26,512, the forward end of the feeder housing can be constructed so that the header can be quickly and easily attached thereto. Usually, the feeder housing structure is rectangular in cross section and includes a rectangular crop inlet opening at the forward end which matches with a crop outlet opening of a header attached to the feeder housing.

With the modern trend of developing headers of increasingly larger sizes, providing a ready capability for the headers to follow the contours of the ground is vital. One type of prior art leveling or flotation mechanism, such as disclosed in U.S. Pat. No. 3,981,125, involves the twisting of the feeder housing structure about the generally fore-and-aft extending centerline thereof to effect an associated lateral floating movement of the header. Also hillside combine harvesters have been developed to allow the header to follow slopes of up to 45%. Such hillside combine harvesters have been known to utilise a side pivot mechanism, as disclosed in U.S. Pat. No. 3,731,470, or a center-mounted pivot connection directly between the header and the feeder housing as disclosed in U.S. Pat. No. 2,780,903; the latter arrangement involving a specific circular or semi-circular opening between the feeder housing and the header.

Problems that have been encountered with these prior art lateral float mechanisms include a difficult sealing situation between the feeder housing and the base unit as the feeder housing is twisted relative to the base unit. The twisting of the feeder housing also results in a twisting of the feeder housing drive mechanism, which in turn also increases wear and reduces the life of the drive chains or the like. Another problem encountered is the matching of different types of headers to different feeder housing structures. This problem is particularly relevant to feeder housings having specially shaped crop inlet openings.

In other known header flotation systems use is made of one or two hydraulic actuators connected between the header and the base unit of a machine to pivot the header in a transverse direction around a generaly fore-and-aft pivot axis and which are interconnected hydraulically with a header weight compensation device including control actuators together with a hydro-pneumatic accumulator which effect raising and lowering of the header. In operation, the hydraulic system, inclusive the hydro-pneumatic accumulator is pressurized at a operating pressure such that the ground contact pressure of the header is minimal. This allows the header to follow the irregularities in the ground contour by as well raising or lowering the complete header as by pivoting the header in the transverse direction depending on the size of the irregularities and on the location thereof relative to the header. With headers having a weight imbalance, such as grain headers having the drive means located at one side, a single flotation actuator can be used at the side of the drive means, but with balanced headers, two flotation actuators are used, one at or towards each side of the header.

In still another known header flotation system such as disclosed in U.S. Pat. No. 3,386,235, the header is formed in two parts which can pivot independently from each other and relative to the feeder housing around respective fore-and-aft extending pivot axes. These parts also can be raised or lowered in unison together with the feeder housing upon which they are mounted, around a transverse pivot axis. A hydraulic suspension system, including cylinders supporting the feeder housing with the header thereon on the base unit and further cylinders supporting the header portions on the feeder housing, is coupled to a hydraulic control mechanism which is actuated by variations in hydraulic pressure in the respective cylinders in response to corresponding movements of the header, respectively the constituent portions thereof over undulations in the ground. The arrangement is such that said variations in pressure transmitted to the control mechanism cause the control mechanism to allow hydraulic pressure fluid to flow to or from the respective cylinders so as to compensate for said variations and tend to maintain a substantially constant hydraulic pressure in the respective cylinders. Hydro-pneumatic accumulators, operating at the system pressure, are coupled to the various cylinders for assisting in a smooth following of the ground irregularities by the header and the constituent portions thereof.

With the latter two systems, the header must always be in contact with the ground at least at some point along its length so that these headers cannot be set to operate at a given stubble height, for example, which is a disadvantage. This is not so with an automatic header height and lateral flotation control system such as disclosed in the co-pending European patent application No. 86.200.600 and which uses sensors on the underside of the header. Such sensors produce electrical signals for controlling the flotation actuators via electro-hydraulic valves, thus making the system automatic. However, other disadvantages arise with such automatic systems, the main one of which is that they are slow acting. Furthermore, these systems are expensive and the sensors thereof can suffer damage when the header encounters a large obstruction and the header tilting is too slow to clear this obstruction smoothly. The slow-acting nature of such automatic systems also can place excessive torsional forces on the header and front end of the machine to which it is fitted (for example the feeder housing of a combine harvester) when the header tilts on meeting an irregularity in the ground and until the system has responded and effected the required flotation to compensate. Although an automatic system can operate with the header off the ground because it is not part of a header weight compensation system, it cannot be set to give any desired initial position of the header which deviates from the nominal position of the header because the electrohydraulic control valves for the flotation actuators can only be set through the sensors.

SUMMARY OF THE INVENTION

The instant invention is directed to a lateral combine header flotation system for pivoting the header about a generally fore-and-aft extending axis and which includes a single hydraulic actuator extending between the header and the base unit (i.e. the feeder housing of the base unit) and which is operable to position the header in a nominal position intermediate opposite extreme positions prior to starting flotation operation. This flotation system further also comprises an energy storage means in the form of a hydropneumatic accumulator coupled to the flotation actuator and which is pressurized at a pressure greater than the working pressure which is present in the actuator when the header is in its nominal position and meets no obstruction whereby this energy storage means becomes operative upon pivotal movement of the header in one direction and becomes inoperative upon pivotal movement of the header in the opposite direction when the header meets an obstruction causing the one or the other of said pivotal movements. The arrangement is such that, when the header pivots in said one direction, the actuator retracts so that the energy storage means stores the energy created by the flow of hydraulic fluid out of the actuator and then releases that energy to restore the header to its nominal position when the header is free to move, i.e. when the header has cleared the obstruction causing said pivotal movement. When the header pivots in said other direction, the energy storage means remains inoperative and as such allows the header so to pivot and return to its nominal position by making use of external return forces only.

This hydraulic system is generally a one-way system to the extent that the energy storage means is operative in one direction only. Also, energization of the flotation actuator pivots the header in one direction only and use has to be made of an external return force in the form of either a header imbalance, a spring force or a hydraulic coupling to the header suspension system to pivot the header in the opposite direction.

To make the above-described lateral header flotation system more universally applicable, the harvester may comprise:

a mobile base unit adapted for movement over the ground, a transversely extending crop harvesting header supported from the base unit for allowing pivotal movement about a generally fore-and-aft axis of the machine, and a lateral flotation system for pivoting the header about the generally fore-and-aft axis and including:

(a) a two way hydraulic actuator means extending between the header and the base unit for pivoting the header in the one or the other direction and positioning the header in a nominal position intermediate opposed extreme positions prior to starting flotation operation, (b) a pressure source coupled by a pair of pressure fluid supply lines to the hydraulic actuator means; and (c) energy storage means connected to the hydraulic actuator means.

The harvester is characterized in that the energy storage means is in the form of a hydro-pneumatic accumulator coupled to each one of the pressure fluid supply lines and pressurized at a pressure greater than the working pressure of the hydraulic actuator means for pivoting the header in the one or other direction; the arrangement being such that, when the header is positioned at a nominal position and meets an obstruction, said header is permitted to temporarily pivot in the one or other direction away from its nominal position for moving over said obstruction; this pivotal movement resulting in the gas in one hydro-pneumatic accumulator being temporarily compressed by the flow of pressure fluid out of the actuator means to store energy; this pressure fluid subsequently being released back to the actuator means to restore the header to its nominal position upon the header clearing the obstruction and; the gas volume in the other hydro-pneumatic accumulator remaining unchanged during this pivotal movement away from, and back to the nominal position whereby said other hydro-pneumatic accumulator remains inoperative under this condition.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
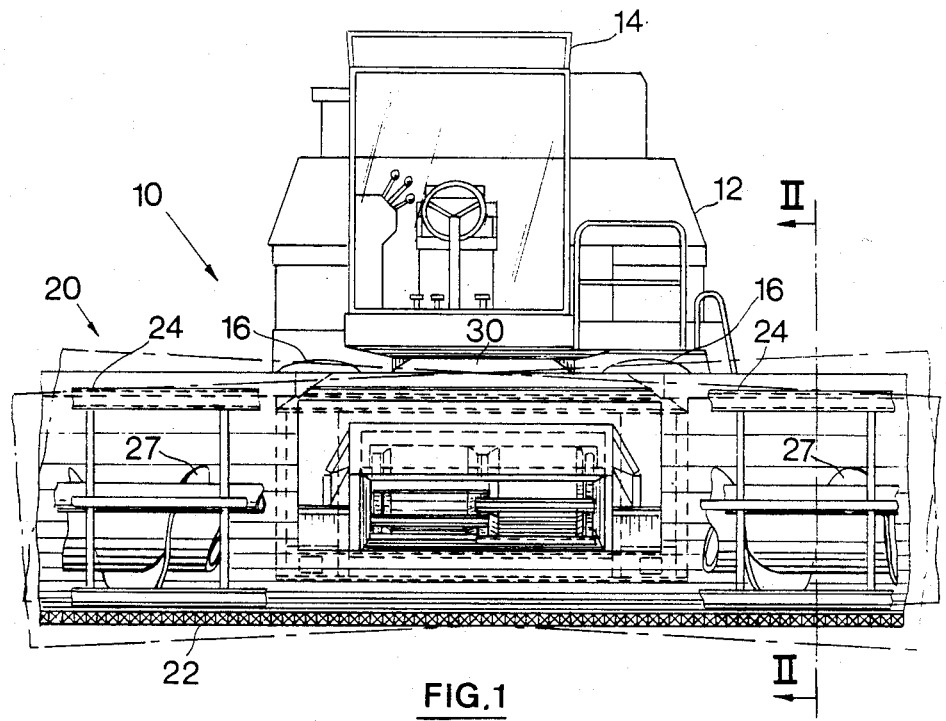
FIG. 1 is a front elevational view of a self-propelled combine harvester and attached grain header, incorporating the principles of the instant invention, components being broken away.
Figure 3:
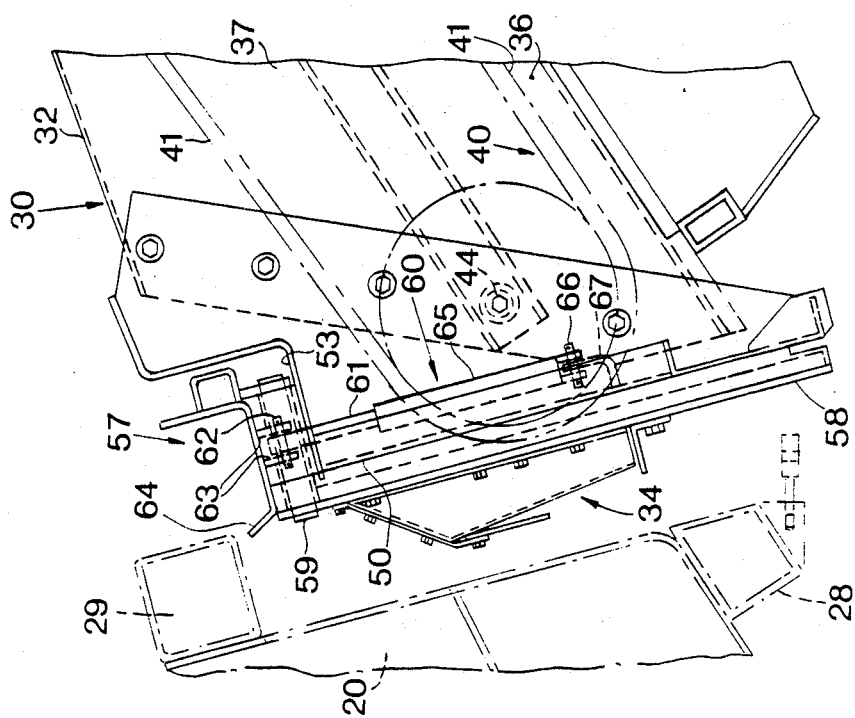
FIG. 3 is a side elevational view, to a larger scale, of the forward portion of the feeder housing.

Referring to FIGS. 1 and 3 of the drawings, left hand and right-hand references are used as a matter of convenience and are determined by standing at the rear of the machine and facing the forward direction of travel. The combine harvester is generally indicated at 10 and comprises a base unit 12, including crop-treating means (not shown) for separating the desired crop material from the waste crop material, a detachable crop-gathering header 20 located forwardly of the base unit 12, a cab 14 elevated above the header 20 for full view of the crop harvesting process, wheels 16, and a feeder housing 30 for conveying cut crop material from the header 20 rearwardly to the base unit 12 for treatment by the crop-treating means which, for example, can be a conventional threshing unit or the more recently developed rotary type axial flow threshing unit.

Figure 2:
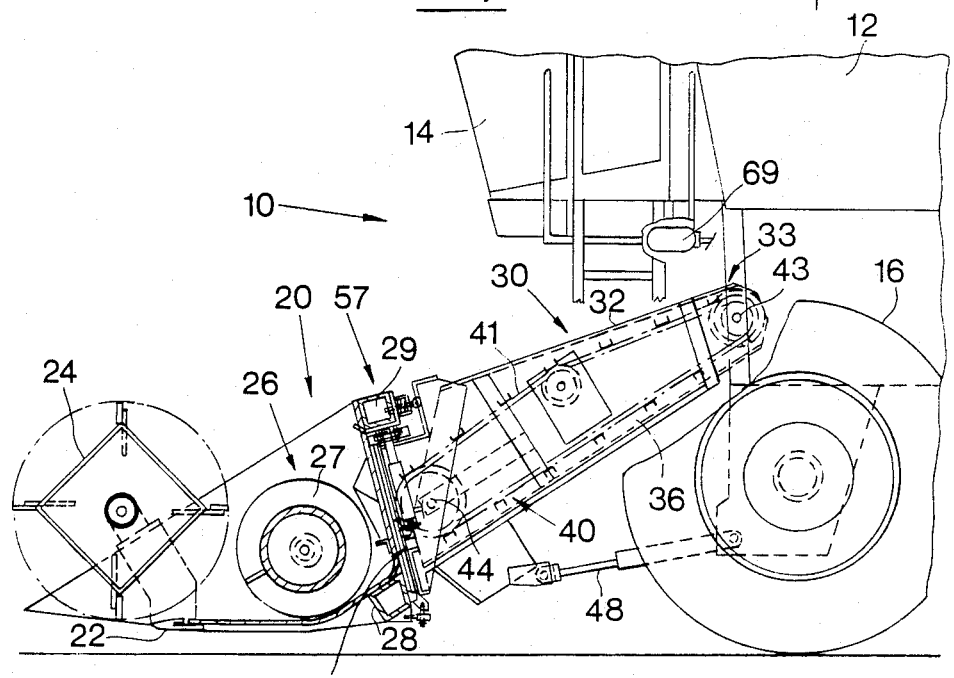
FIG. 2 is a cross-sectional view of the forward portion of the combine harvester including the header and feeder housing, taken along the line II—II of FIG. 1.

Referring now to the cross-sectional view of FIG. 2, a more detailed view of the general inner workings of the header 20 and the feeder housing 30 can be seen. The header 20 includes a cutterbar 22 operable to sever crop material from the stubble. A reel 24 is disposed above and forwardly of the cutter bar 22 to sweep crop material over the latter and transport it rearwardly to crop consolidating means 26 in the form of a consolidating auger 27. The consolidating auger 27 converges crop material towards a centrally disposed crop discharge opening for discharge to the feeder housing structure 30. A frame 28 of the header 20 includes a transversely disposed main header beam 29 used to support the header 20 from the feeder housing 30.

As can also be seen in FIG. 2, the feeder housing 30 has a forwardly extending, elongated body portion 32 defined by a rearward end 33 pivotally attached to the base unit 12 and a forward end 34 adjacent the header 20 for connection thereto. The body portion 32 includes a passageway 36 therethrough, terminating in a crop inlet opening at the forward end 34, for allowing crop material to be transported rearwardly from the forward end 34 to the rearward end 33. Crop conveying means 40 in the form of an endless chain and slat apron conveyor 41 is positioned within the passageway 36 and is operable to transport the crop material rearwardly. The apron conveyor 41 is driven by a drive shaft 43 positioned at the rearward end 33 and is supported on a driven shaft 44 adjacent the forward end 34. The height of the header 20 relative to the ground is controlled by a header lift means in the form of a pair of hydraulic actuators 48 interconnecting the feeder housing 30 and the base unit 12. By extending the actuators 48 the rearward end 33 of the feeder housing 30 is pivoted about the drive shaft 43 whereby the header 20 is lifted from the ground without significantly changing the discharge point of the apron conveyor 41 relative to the base unit 12. These hydraulic actuators 48 may be part either of an automatic header height control mechanism of any type known in the art or of a header weight compensation mechanism equally known in the art.

Referring now to FIG. 3, an enlarged view of the forward end 34 of the feeder housing 30 showing a front face member 50 and a detached header 20 in phantom proximate thereto, can be seen. The front face member 50 includes an offset section 53 substantially registrable with the main header beam 29 for detachably supporting the header 20 in an operable position on a cradle 58 still to be described hereafter.

A lateral flotation system 57 for the header is best seen in FIG. 3 and comprises the cradle 58 already mentioned and which is pivotally attached to the front face member 50 at the forward end 34 of the feeder housing 30 by a pivot pin 59. The cradle 58 comprises a nesting portion 64 for the main header beam 29 at a position generally within the offset section 53 of the front member 50. The components so far described are similar to those of the combine harvester illustrated in U.S. Pat. No. 4,253,295 to which reference is made and which discloses further details of construction which are not relevant to the present invention.

In accordance with the present invention, the flotation mechanism 57 further comprises a hydraulic actuator 60 which, in the preferred embodiment, is of the single acting type and the rod 61 of which is pivotally attached to the cradle 58 by a pin 62 extending between a pair of lugs 63 depending from the nesting portion 64 of the cradle 58 which releasably receives the main header beam 29. The cylinder 65 of the actuator 60 is pivotally attached by a pin 66 to a bracket 67 fixed to, and extending rearwardly from the front face member 50 of the feeder housing 30 at the forward end 34 thereof and against which the lower portion of the cradle 58 is movably supported. The header 20 is firmly coupled to the cradle 58 for being transversely pivotable therewith after the main beam 29 of the header 20 is positioned in the nesting portion 64 of the cradle 58. The actuator 60 is thus effectively connected between the main body 12 of the machine and the header 20, the actuator 60 being disposed at the side of the feeder housing 30 corresponding to the side of the header 20 at which the header drive is fitted, i.e. at the side of the imbalance.

Figure 4:
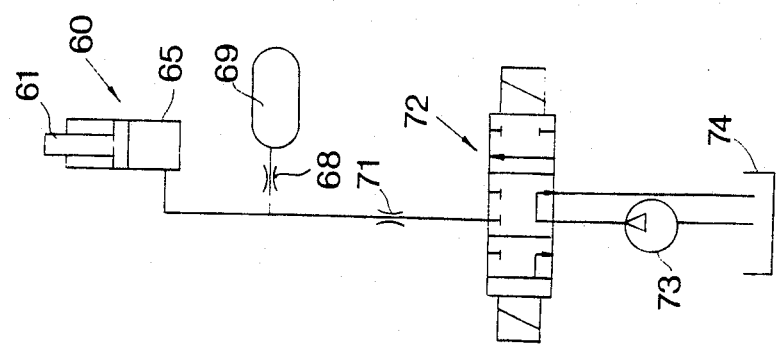
FIG. 4 is a hydraulic circuit diagram of the header flotation system in accordance with the invention.

As can best be seen in FIG. 4, the actuator 60 is connected hydraulically via a restrictor 68 to an energy storage device in the form of an accumulator 69 (mounted below the cab 14) and also connected, via a restrictor 71, to a three-position spool valve 72 to which is connected a hydraulic pump 73 for the system and a connection to tank 74. In the central position of the valve 72 (the position illustrated) the pump 73 is vented directly to the tank 74 and the actuator 60 is only connected to the accumulator 69. If the valve spool is moved to the right as seen in FIG. 4, the actuator 60 is vented to the tank 74 and if it is moved to the left, the actuator is subjected to system pressure from the pump 73. It should be noted that, under normal operating conditions, the pressure in the accumulator 69 is higher than that in the actuator 60. Preferably this difference is in the range of 10 bar.

It also should be noted that the flotation system thus described is totally independent from the header lifting system although it may be used in combination with an automatic header height control mechanism. It even may be used in combination with a header weight compensation mechanism although the combination with an automatic header height control mechanism is preferred.

In operation of the machine and provided the hydraulic actuators 48 are not part of a header weight compensation mechanism, the feeder 30 can be set at any required height relative to the ground, including at a height whereat the header 20 makes contact with the ground, by operating the actuators 48 accordingly. In the event the hydraulic actuators 48 are part of a header weight compensation mechanism, the header 20 then of course should be positioned to contact the ground surface.

Additionally and prior to commencing operation, the operator also actuates the valve 72 to pressurize the hydraulic flotation circuitry normally so as to position the header 20 in its nominal or level position relative to the base unit 12. By doing so, an operating pressure is established in the actuator 60 which is sufficient to pivot the header 20 away from its rest position towards the intermediate nominal position and thus, which compensates the header imbalance. Indeed, without this pressurizing, the header 20 is positioned in an inclined position with the rod 61 fully retracted within the cylinder 65 of the actuator 60 and with the end of the header 20 supporting the header drive means (i.e. the end of the header 20 at which the imbalance is situated) being situated at a level below the other end due to the header imbalance. As already mentioned, the operating pressure thus established in the actuator 60 is less than the gas pressure in the hydro-pneumatic accumulator 69 whereby the above described initial setting of the header does not vary the gas volume in the accumulator 69 which thus fills the entire accumulator body.

Once the operating position of the header 20 has been set, the machine moves forwardly and commences harvesting in the conventional manner. Should the header 20 meet a transverse irregularity in the ground, which may be a temporary transversely offset obstruction or a transverse slope, for example, then one side of the header will rise and the opposite side will drop in view of the pivotal mounting of the cradle 58 about the pivot 59 so as to permit the header 20 to move over and clear said irregularity. Assuming this pivotal movement of the header 20 is such as to move the rod 61 of the actuator 60 into the cylinder 65 (i.e. the actuator 60 contracts) the fluid thus forced out of the cylinder is forced into the accumulator 69 and increases the pressure therein as the connection to the tank 74 is blocked by the central valve position. If the irregularity is only temporary, then when it is cleared by the header 20, the latter will pivot back to its former (nominal) position under the pressure of the accumulator 69, which is sufficient to overcome any frictional resistance in the pivotal mounting of the header. The gas in the accumulator expands until it fills the accumulator volume completely again and thus until all pressure fluid, which previously was urged into the accumulator by the irregularity, is urged back to the flotation actuator 60. Thus, the header 20 always is returned to the same nominal position as initially set by the operator when the header 20 has cleared the obstruction.

Should the header 20 pivot in the opposite direction, the actuator 60 is extended as the rod 61 is pulled out of the cylinder 65 and a partial vacuum is created therein (a breather valve may be fitted if desired in this respect). This vacuum is created because the accumulator 69 is unable, because of its nominal setting, to urge more hydraulic pressure fluid into the actuator 60 to the extent that the gas in the accumulator 69 already occupies the entire volume of the accumulator 69. When the header 20 is free to return to its former position, it does so under the weight imbalance of the header in the illustrated embodiment, this weight imbalance equally being sufficient to overcome any frictional resistance in the pivotal mounting of the header 20, whereby also starting from this side of the nominal position, the header always is returned to its nominal setting when the ground surface beneath the header permits this.

From what precedes, it will be understood that the hydro-pneumatic accumulator 69 as used in the present invention on the one hand and the header imbalance on the other hand effectively act as "power sources" for always returning, without any hesitation, the header 20 back to the same nominal position previously set by the operator when the ground surface below the header 20 permits this to happen, i.e. when any irregularities in the ground have been cleared by the header. These returning forces are sufficiently large to overcome any frictional resistance in the pivotal mounting of the header which inherently is present and which, in prior art arrangements also using a hydro-pneumatic accumulator, prevent the header to return to the nominal position when the deviation from said nominal position is rather small. Unlike in these prior art arrangements where the hydro-pneumatic accumulator has a working pressure which corresponds to the working pressure of the flotation actuator and thus acts mainly to absorb hydraulic pressure fluid urged out of the flotation actuator without substantially varying the working pressure and whereby it becomes a rather "passive" component, the hydro-pneumatic accumulator according to the present invention, is rather "active" in the header flotation operation to the extent that it truely forms a power source in the sense as already described which is operable to always return the header to the same nominal position even when the deviation therefrom is minimal.

If the operator wishes to set the header 20 at an angle to the nominal horizontal position, he operates the valve 72 to one side or other of the central position so as to pressurise or vent the actuator 60 to give the desired header tilt perhaps to compensate for a permanent irregularity in the field being harvested. When this control of the header 20 is being exercised, the restricter 71 damps header movement so that the latter is controlled. Also restrictor 68 has a stabilizing function as will be readily understood by any one skilled in the art.

In the preferred embodiment as described above, the header is of the type having an imbalance due to the header drive means being provided adjacent one end thereof, this imbalance being used for providing header flotation in one direction. However, the principles of the present invention also can be applied to a fully balanced header (such as e.g. a corn header). In this case the header imbalance may be replaced by a spring force provided by spring means extending between the cradle 58 and the feeder housing 30 at the side of the latter opposite to the side at which the actuator 60 is provided. These spring means are arranged to pivot the cradle 58 with the header 20 thereon in the direction around the pivot 59 so as to retract the rod 61 into the cylinder 65 of the actuator 60.

In a further alternative embodiment shown in FIG. 5 the return force acting on the flotation actuator 60 is obtained by a hydraulic coupling of the flotation actuator 60 to the header lifting actuators 48 below the plungers thereof. In this case, the flotation actuator 60 is of the double acting type and is coupled at its plunger rod side to the header lifting actuators 48; the other side of the flotation actuator 60 being coupled to the hydro-pneumatic accumulator 69 and the valve 72 in the same manner as described in connection with FIG. 4. The pressure reigning in the header lifting actuators 48 when the header is in the operative position, is communicated to the plunger rod side of the flotation actuator 60 where it causes a return force oriented opposite to the flotation force resulting from the pressure below the plunger thereof and which acts in the same manner as the imbalance of the preferred embodiment and as the resilient return force of the spring means of the first alternative embodiment. The arrangement again is such that the work pressure below the plunger of the flotation actuator is less than the gas pressure in the accumulator 69. It will be appreciated that this alternative arrangement operates in the same manner as the preferred embodiment and that therefore a detailed description of the operation is not necessary.

The hydraulic coupling between the flotation actuator 60 and the header lifting actuators 48 may comprise a two-position spool valve 80 for enabling the operator either to establish the coupling as described in case the harvester is equipped with a balanced header, or to interrupt this coupling in case the harvester is equipped with an unbalanced header, in which case the header imbalance provides the return force as described in connection with FIG. 3.

Figure 5:
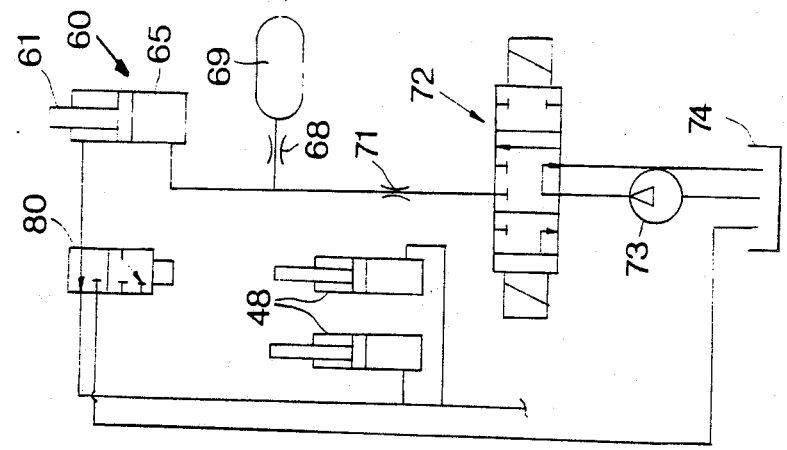
FIGS. 5–8 are views similar to FIG. 4 but showing alternative arrangements.

From what precedes, it will be clear to one skilled in the art that the arrangements illustrated in FIGS. 4 and 5 basically are "one-way" systems to the extent that, on the one hand, the hydro-pneumatic accumulator is operative in one direction only and, on the other hand, energization of the flotation cylinder pivots the header also in one direction only whereby use must be made of external forces provided by either a header imbalance, a spring or a hydraulic coupling to the header suspension system to pivot the header in the opposite direction. This may be felt as a shortcoming to the extent that such systems are not readily universally applicable.

Figure 6:
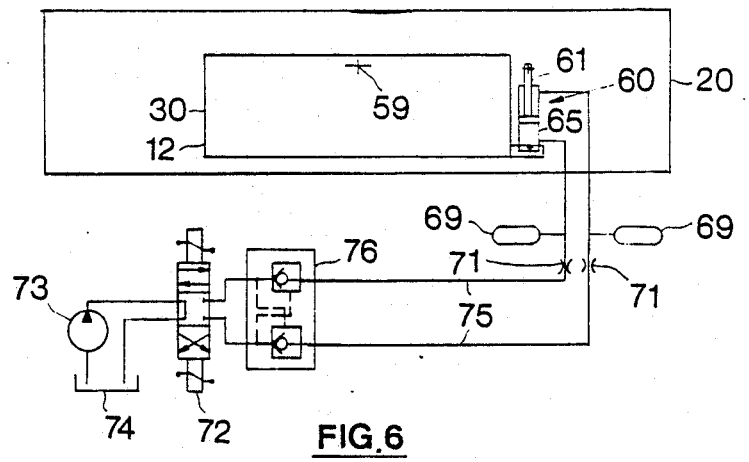
Figure 7:
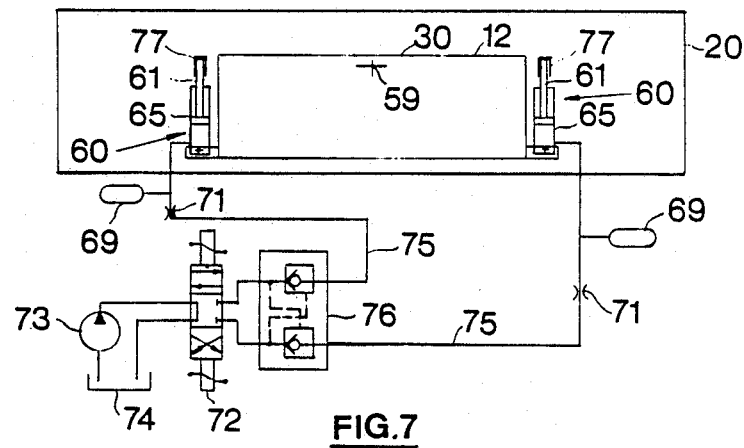
Figure 8:
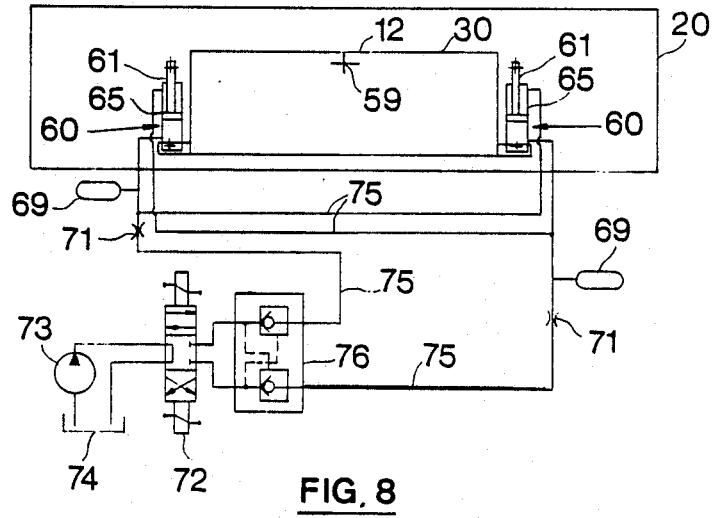

With reference to FIGS. 6-8, three "two-way" or "double acting" lateral header flotation systems now will be described in more details. With these arrangements lateral flotation positively is controlled in both directions by means of energy storage means.

Turning now specifically to FIG. 6 which schematically illustrates a first "two-way" embodiment of the header flotation system, it will be noticed that a two-way hydraulic actuator means in the form of one double-acting cylinder 60 extends between the header 20 and the base unit 12 (actually the feeder housing 30). This double-acting hydraulic cylinder 60 is operable to pivot the header 20 in the one or other direction around the pivot 59 for positioning said header in a nominal position intermediate opposed extreme positions prior to starting flotation operation. To this end, the flotation cylinder 60 is coupled via a pair of pressure fluid supply lines 75 and the valve 72 to the pressure source 73. One pressure fluid supply line 75 is coupled to the plunger side and the other pressure fluid supply line 75 is coupled to the plunger rod side of the cylinder 60. The valve 72 is a conventional three-position, four-way electromagnetic valve which further also is coupled to the reservoir 74. In accordance with the present invention, a hydro-pneumatic accumulator 69 is coupled to each one of the pressure fluid supply lines 75. Both accumulators 69 are pressurized at pressures greater than the working pressures of the cylinder 60 required to pivot the header in the one or other direction. Preferably these differences between the working pressures in the cylinder 60 and the gas pressures in the accumulators 69 are at least 10 bar.

To the extent that the working pressures in the cylinder 60 at the plunger and plunger rod sides may be different, the gas pressures in the accumulator 69 equally may be different, although for practical reasons, these gas pressures may be set at the same valve; the only requirement being that these gas pressures exceed the working pressures with an amount which is sufficient to overcome friction forces in the pivotal mounting of the header as well as eventual header imbalances. From what precedes it thus will be appreciated that, when the header is in the nominal position and meets no obstruction, the gas in the respective hydro-pneumatic accumulators 69 occupies the entire volume thereof. Further, it also will be clear that, by utilizing the valve 72 the header 20 is selectively positionable, in any one nominal position from a range of positions inbetween two extreme positions without changing the gas pressure in the accumulators 69.

The hydraulic circuitry further also comprises a pilot operated check valve 76 which assists in isolating the flotation cylinder 60 and the accumulator 69 completely from the reservoir 74 when the valve 72 is in its neutral (central) position. Without this check valve 76 pressure fluid possibly could leak back to the reservoir 74 when the valve 72 is in its shut off position. This would adversely affect the flotation operation.

Flow restrictors 71 are included in both pressure supply lines 75 between the check valve 76 and the coupling of the accumulators 69 to said pressure supply lines 75 to damp the pivotal movement of the header 20 upon actuation of the valve 72 in the one or other direction. These flow restrictors 71 should not affect the interaction between the flotation cylinder 60 and the accumulators 69.

When commencing operation, the operator may actuate valve 72 in the one or other direction to position the header 20 in any desired nominal position if this position is not already installed. Should the header 20 subsequently meet a transverse irregularity in the ground during operation of the harvester, then one side of the header will rise and the opposite side will drop to permit the header to move over and clear said irregularity. Assuming this pivotal movement of the header 20 is such as to contract the cylinder 60, the fluid thus forced out of the plunger side of the cylinder is forced into the corresponding accumulator 69 and increases the pressure therein. Simultaneously, a partial vacuum is created in the cylinder 60 at the plunger rod side thereof to the extent that the gas in the accumulator 69 coupled to this plunger rod side cannot expand further in as much as this gas already occupies the complete volume of said accumulator. During this operation, the valve 72 of course is in its neutral shut off position, which is why the one accumulator 69 absorbs pressure fluid from below the plunger of the cylinder 60 and the other accumulator 69 remains inoperative. When subsequently the irregularity in the ground is cleared by the header 20, the latter will pivot back to its former (nominal) position under the pressure of the accumulator 69 which is coupled to the plunger side of the cylinder 60 and which is sufficient to overcome any frictional resistance in the pivotal mounting of the header 20. The gas in this accumulator 69 expands until it fills the accumulator volume completely again and thus until all pressure fluid, which previously was urged into said accumulator 69 by the irregularitiy, is urged back to the plunger side of the flotation cylinder 60. The vacuum at the plunger rod side of the cylinder 60 permits this return movement to occur.

Should the header 20 pivot in the opposite direction, the cylinder 60 is extended as the plunger rod 61 thereof is pulled out of the cylinder body 65 and a partial vacuum now is created at the plunger side on the one hand while that pressure fluid from the plunger rod side of the cylinder 60 is urged into the accumulator 69 coupled to said plunger rod side on the other hand. It will be readily appreciated by one skilled in the art that this condition is practically identical to the condition described hereabove and thus that, once the header 20 has cleared the irregularity, the latter again automatically returns to its nominal position by the action of the accumulator 69 coupled to the plunger rod side of the cylinder 60. Thus, the header 20 always is returned to the same nominal position as initially set by the operator when the header 20 has cleared any transverse obstruction.

From what precedes it will be appreciated that the header flotation system including the two hydro-pneumatic accumulators 69 operates independently of the direction of the deviation of the header 20 from its nominal position. In other words, the one or the other accumulator 69 becomes operative, depending on the direction of said deviation, to restore the header 20 to its nominal position as soon as it is permitted to do so by the clearing of any ground irregularity. It further also will be noticed that with this "two-way" system according to FIG. 6, operation of the flotation system does not rely on external forces such as can be obtained from a header imbalance, a spring or a hydraulic coupling to the header suspension mechanism. Thus, this "two-way" flotation mechanism is more universal in as much as it can be utilized in combination with a balanced header as well as with an unbalanced header.

Turning now to FIG. 7, it will be noticed that the only difference between the embodiment shown therein and the embodiment shown in FIG. 6 is the replacement of the one double acting cylinder 60 according to FIG. 6 by a pair of single acting cylinders 60 according to FIG. 7. One of these cylinders 60 is provided at each transversely opposite side of the pivot axis 59 and is connected to a corresponding pressure fluid supply line 75. The operation of this embodiment is very similar to the operation of the embodiment shown in FIG. 6 and is such that any temporary pivotal displacement of the header 20 in the one or other direction away from its nominal position as a result of the header 20 encountering an obstruction, causes one hydraulic cylinder 60 to retract and the other hydraulic cylinder 60 to extend (provided the plunger of this cylinder is positively coupled to the header). The retraction of the one cylinder 60 results in the gas in the corresponding hydropneumatic accumulator 69 to be compressed by the flow of hydraulic fluid out of said one hydraulic cylinder to store energy in said accumulator 69. This energy subsequently is released back to said one hydraulic cylinder 60 for restoring the header 20 to its nominal position upon the header clearing the obstruction which previously caused the pivotal deviational movement. During this pivotal movement of the header 20 away from its nominal position, the other cylinder 60 is extended, as already said. This causes a vacuum to be established therein which however has no effect on the flotational operation of the header 20. When the header 20 subsequently returns to its nominal position, this vacuum merely is eliminated again as is the case in the arrangement according to FIG. 6.

When using two single acting hydraulic cylinders 60 as shown in FIG. 7 it is possible to avoid the creation of a vacuum in the one or other cylinder 60 when the flotation system is operational. To accomplish this, it is sufficient to telescopingly couple the plungers 61 of the cylinders 60 to the header 20 in a manner to permit the corresponding portions of the header 20 to pivot away from anyone of said plungers 61 without causing a corresponding extension of the cylinders 60. This is schematically shown in FIG. 7 and is realized by the use of a pair of sleeves 77 which are attached to the header 20 and which each receive the plunger 61 of a corresponding hydraulic cylinder 60. When the header 20 is in any nominal position, the plungers 61 of the cylinders 60 abut with the bottom of the respective sleeves 77. When the header 20 temporarily is pivoted away from this nominal position in the one or other direction, one sleeve 77 pushes the plunger 61 into the cylinder body 65 of the corresponding hydraulic cylinder 60 while that the other sleeve 77 telescopes relative to its corresponding plunger 61 and away from the corresponding cylinder body 65. Thus, as described before, when the header 20 is pivoted in the one or other direction, one cylinder 60 is caused to retract, which results in the gas in the corresponding accumulator 69 to be compressed. When subsequently the gas in this accumulator 69 is permitted to expand again, the plunger 61 of the corresponding cylinder 60 is caused to extend which in turn causes the header 20 to return to its nominal position. During these pivotal movements of the header 20, the plunger 61 of the other hydraulic cylinder 60 is not moved by virtue of the telescopic coupling thereof to the corresponding sleeve 77 and thus, unlike in the arrangement described herebefore, a vacuum is not created in this other hydraulic cylinder 60.

Turning now finally to FIG. 8, it again will be seen that the arrangement illustrated therein is basically the same as the arrangement according to FIG. 7, except for the fact that the single-acting hydraulic cylinders 60 of FIG. 7 are replaced by double-acting cylinders 60. In this embodiment, any one pressure fluid supply line 75 is connected both to the plunger side of one cylinder 60 and to the plunger rod side of the other cylinder 60.

Also the plungers 61 now are positively coupled to the header 20. Consequently, when the header is caused to pivot in the one or other direction, one cylinder 60 is contracted and the other cylinder 60 is extended. Pressure fluid which is urged out of the plunger side of the one cylinder 60 which is contracted and out of the plunger rod side of the other cylinder 60 which is extended, is urged into the accumulator 69 associated with said sides of the respective cylinders 60. Gas in this accumulator 69 thus is compressed to store energy therein. This energy is released back to said opposite sides of said cylinders 60 for restoring the header to its nominal position upon the header clearing the obstruction, which caused the initial pivotal movement. Thus the one cylinder 60 which previously was contracted, is extended again and the other cylinder 60 which previously was extended is retracted again by the release of said energy from said accumulator 69. During this pivotal movement of the header away from and back to its nominal position, a vacuum is established in the pressure fluid supply line 75 associated with the other hydropneumatic accumulator 69 to the extent that the gas in this other accumulator 69, under this condition, occupies the entire volume thereof and thus no hydraulic pressure fluid can be made available from said accumulator 69 to eliminate said vacuum. However, the creation of this vacuum does not noticeably affects the flotation operation of the header 20.

In summary, it thus will be seen that the present invention provides a very simple but highly effective header flotation system which suffers none of the disadvantages of known systems in that both the operating height and orientation can be set without difficulty. This means that the header can still be operated in a weight compensation mode if desired. This also means that, if the header is set to operate at a height above the ground and thus, if there is no permanent contact of the header with the ground, the header nevertheless always returns to the same nominal position previously set by the operator after the header having cleared an obstruction. This would not be the case in prior art arrangements equipped with a hydro-pneumatic accumulator; this accumulator in these arrangements not providing enough power to overcome frictional resistance in the pivotal mounting of the header when the deviation from the nominal position is minimal.

Furthermore, the system is very fast acting, whereby peak loads and high torsional forces on the header and/or front end of the machine to which it is fitted are avoided. This, in turn results in a structure which is less subject to damages and is carefree. Also, the flotation system is very simple in design as well as in operation and is inexpensive to manufacture.

It will be understood that changes in the details, materials, steps and arrangements of aparts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A harvester comprising:
   a mobile base unit adapted for movement over the ground;
   a transversely extending crop harvesting header supported from the base unit for allowing pivotal movement about a generally fore-and-aft axis of the machine;
   a lateral flotation system for pivoting the header about the generally fore-and-aft axis and including a two way hydraulic actuator means extending between the header and the base unit for pivoting the header in the one or the other direction and positioning the header in a nominal position intermediate opposed extreme positions prior to starting flotation operation; a pressure source coupled by a pair of pressure fluid supply lines to the hydraulic actuator means; and energy storage means connected to the hydraulic actuator means;
   said energy storage means being in the form of a hydro-pneumatic accumulator coupled to each one of the pressure fluid supply lines and pressurized at a pressure greater than the working pressure of the hydraulic actuator means for pivoting the header, such that, when the header is positioned at a nominal position and meets an obstruction, said header is permitted to temporarily pivot from said norminal position for moving over said obstruction, this pivotal movement resulting in the gas in one hydro-pneumatic accumulator being temporarily compressed by the flow of pressure fluid out of the actuator means to store energy, this pressure fluid subsequently being released back to the actuator means to restore the header to its nominal position upon the header clearing the obstruction, the gas volume in the other hydro-pneumatic accumulator remaining unchanged during this pivotal movement away from and back to the nominal position, whereby said other hydro-pneumatic accumulator remains inoperative under this condition.

2. A harvester according to claim 1 wherein the gas in the respective hydro-pneumatic accumulators occupies the entire volume thereof when the header is in its nominal position and meets no obstruction.

3. A harvester according to claim 2 wherein the nominal position of the header is selectable from a range of positions inbetween the extreme positions.

4. A harvester according to claim 3 wherein each hydropneumatic accumulator is pressurized at a pressure which exceeds the working pressure in the corresponding pressure fluid supply line for pivoting the header with a value of at least 10 bar.

5. A harvester according to claim 4 wherein the lateral flotation system further also comprises a three position/four-way control valve coupling the pressure source and an associated reservoir to the hydraulic actuator means and the energy storage means, said valve being operable in a first and second position to connect the pressure source to the hydraulic actuator means and the energy storage means for positioning the header in any selected nominal position without varying the gas pressure in the energy storage means and being operable in a third position to isolate the hydraulic actuator means and the associated energy storage means from the pressure source and the associated reservoir for maintaining the lateral flotation system in the operative condition.

6. A harvester according to claim 5 wherein the lateral flotation system further comprises a pilot operated check valve positioned between said three-position/four-way control valve and the hydraulic actuator means and energy storage means, said pilot operated check valve assisting in isolating the hydraulic actuator means and the associated energy storage means from the pressure source and the associated reservoir when said control valve is positioned in said third position.

7. A harvester according to claim 6 wherein each pressure fluid supply line comprises a restrictor positioned between the hydro-pneumatic accumulator coupled to said supply line and the control valve and the pilot operated check valve.

8. A harvester according to claim 7 wherein the two way hydraulic actuator means is in the form of one double acting hydraulic cylinder coupled between the header and the base unit and with the pair of pressure fluid supply lines connected thereto respectively at the plunger and plunger rod sides thereof, such that temporary pivotal displacement of the header in the one or other direction away from its nominal position as a result of said header meeting an obstruction causes the gas in one hydro-pneumatic accumulator to be compressed to store energy therein which subsequently is released back to the hydraulic cylinder for restoring the header to said nominal position upon the header clearing the obstruction and a vacuum to be established in the pressure fluid supply line associated with the other hydro-pneumatic accumulator.

9. A harvester according to claim 1 wherein said two way hydraulic actuator means is in the form of a pair of single acting hydraulic cylinders coupled between the header and the base unit, one cylinder thereof being provided at each transversely opposite side of the generally fore-and-aft pivot axis and being connected to a corresponding pressure fluid supply line such that temporary pivotal displacement of the header away from said nominal position as a result of said header meeting an obstruction causes one of said hydraulic cylinders to retract so that the gas in the corresponding hydropneumatic accumulator is compressed by the flow of hydraulic fluid out of said one hydraulic cylinder for restoring the header to said nominal position upon the header clearing the obstruction while the other said hydraulic cylinder extends to establish a vacuum therein.

10. A harvester according to claim 1 wherein said two way hydraulic actuator means is in the form of a pair of single acting hydraulic cylinders positioned at transversely opposite sides of the generally fore-and-aft extending pivot axis and between the header and the base unit, each said cylinder being connected to a corresponding pressure fluid supply line and having a plunger telescopingly coupled to the header in a manner to permit the corresponding portion of the header to pivot away from said plunger without causing a corresponding extension of said cylinder and the arrangement being such that temporary pivotal displacement of the header away from said nominal position as a result of said header meeting an obstruction causes one of said cylinders to retract so that the gas in the corresponding hydro-pneumatic accumulator is compressed by the flow of hydraulic fluid out of said one hydraulic cylinder to store energy in said accumulator, said energy subsequently being released back to said one hydraulic cylinder for restoring the header to its nominal position upon the header clearing the obstruction and to cause the header to telescopingly move away from the plunger of the other hydraulic cylinder thereby leaving this other cylinder unchanged during said displacement of the header and avoiding the establishment of a vacuum in said other hydraulic cylinder.

11. A harvester according to claim 1 wherein the two way hydraulic actuator means is in the form of a pair of double acting hydraulic cylinders positioned at transversely opposite sides of the generally fore-and-aft extending pivot axis and coupled between the header and the base unit, each pressure fluid supply line being coupled to the plunger side of one hydraulic cylinder and the plunger rod side of the other hydraulic cylinder, the arrangement being such that temporary pivotal displacement of the header away from its nominal position as a result of said header meeting an obstruction causes one hydraulic cylinder to retract and the other hydraulic cylinder to extend, so that the gas in one hydro-pneumatic accumulator is compressed by the flow of hydraulic fluid out of the plunger side of the one cylinder which is retracted and of the plunger rod side of the other cylinder which is extended to store energy in said accumulator, said energy subsequently being released back to said opposite sides of said cylinders for restoring the header to its nominal position upon the header clearing the obstruction while a vacuum is established in the pressure fluid supply line associated with the other hydro-pneumatic accumulator.

\* \* \* \* \*